Aug. 11, 1936.  R. DAUB  2,050,748
TWO-CYCLE ENGINE
Filed April 19, 1933   3 Sheets-Sheet 1
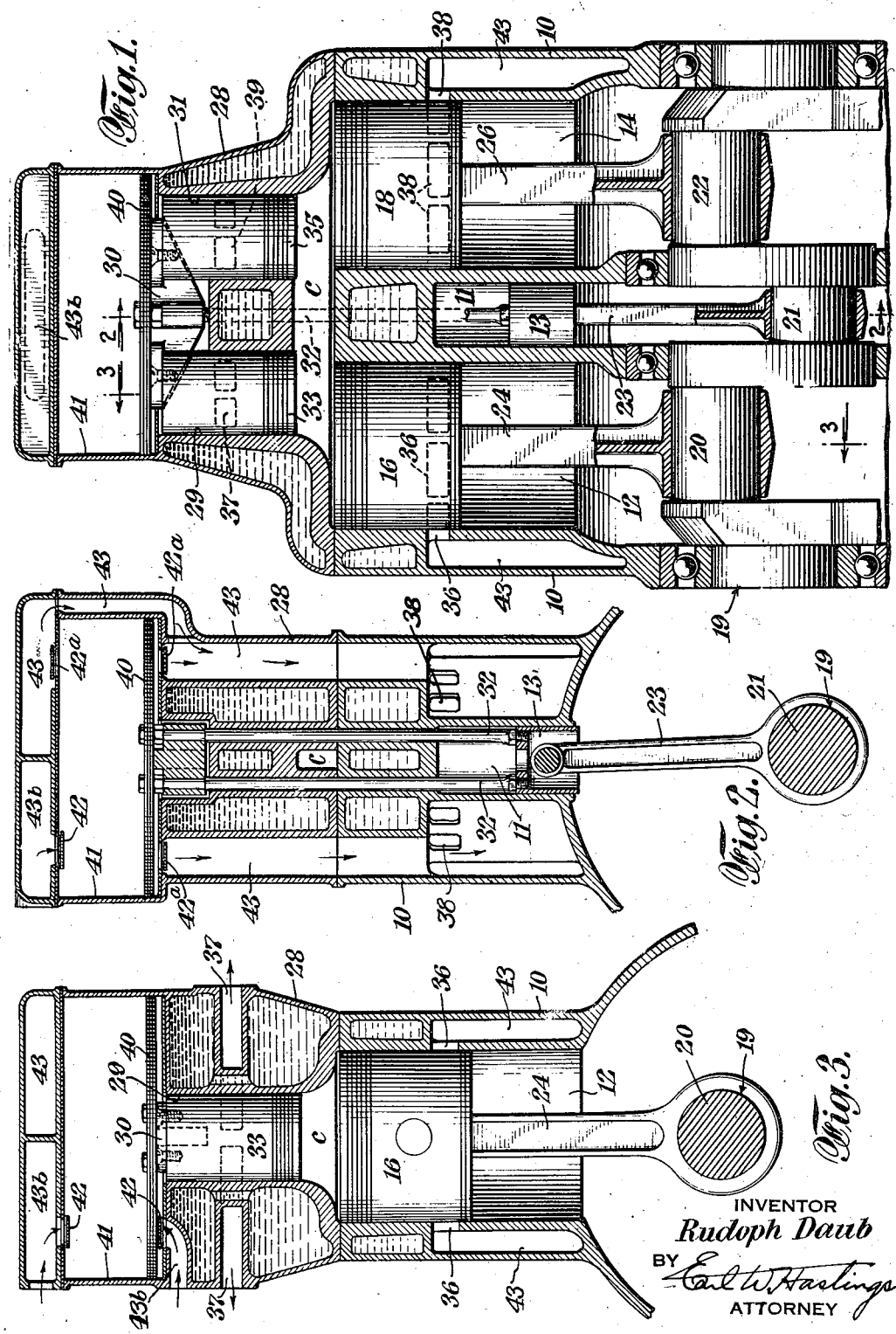
INVENTOR
Rudolph Daub
BY
ATTORNEY

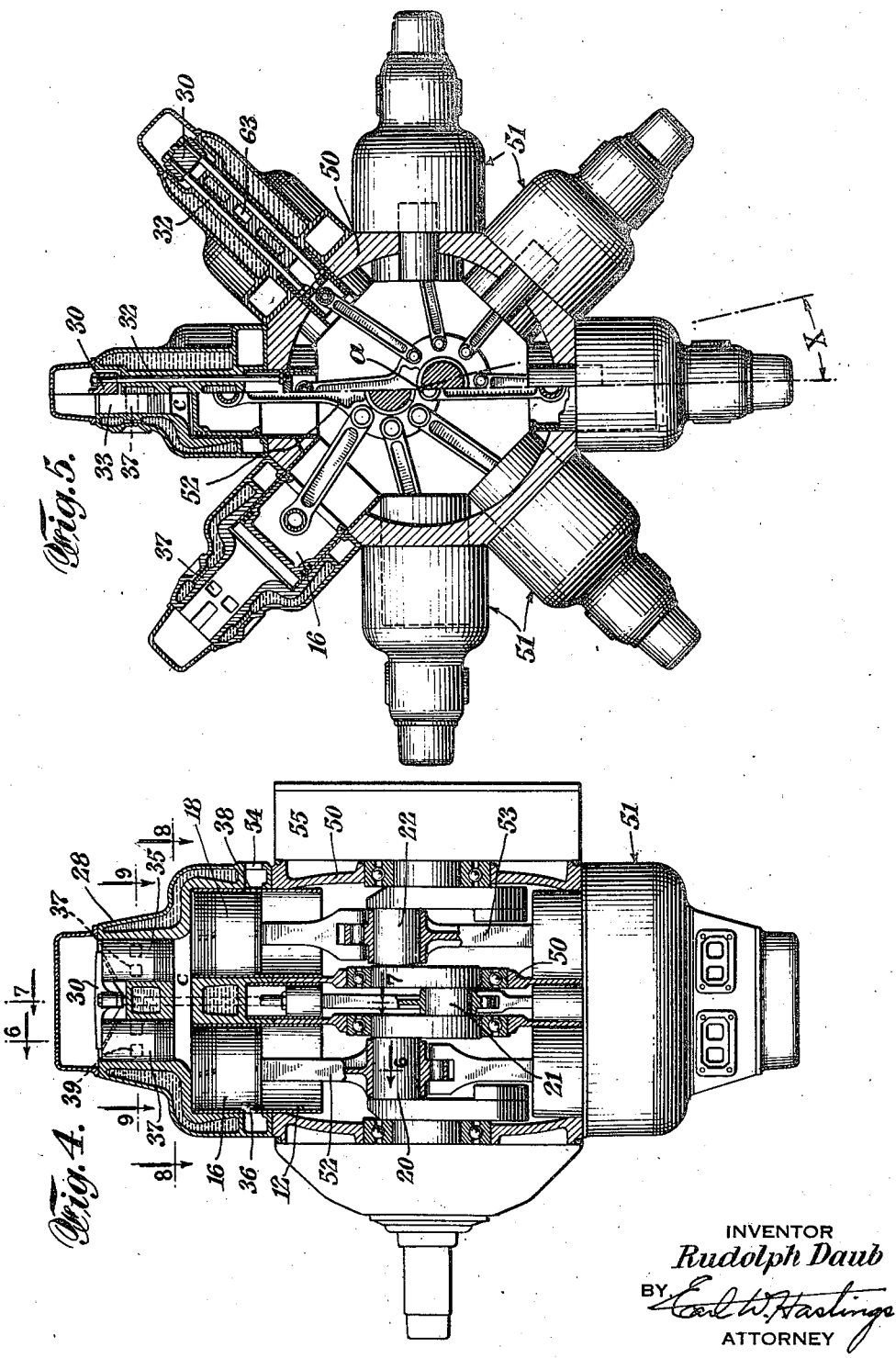

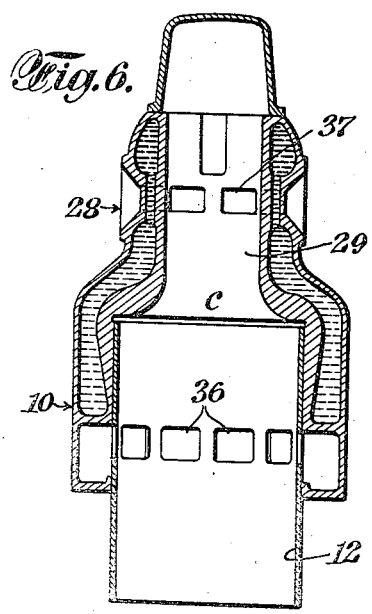
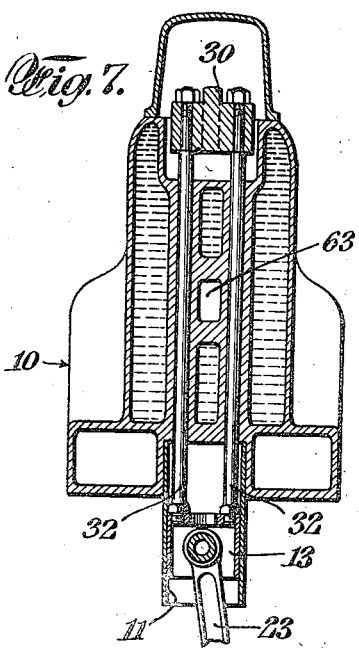
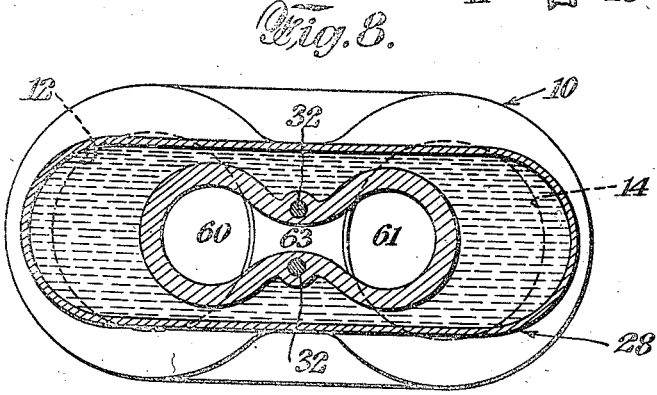
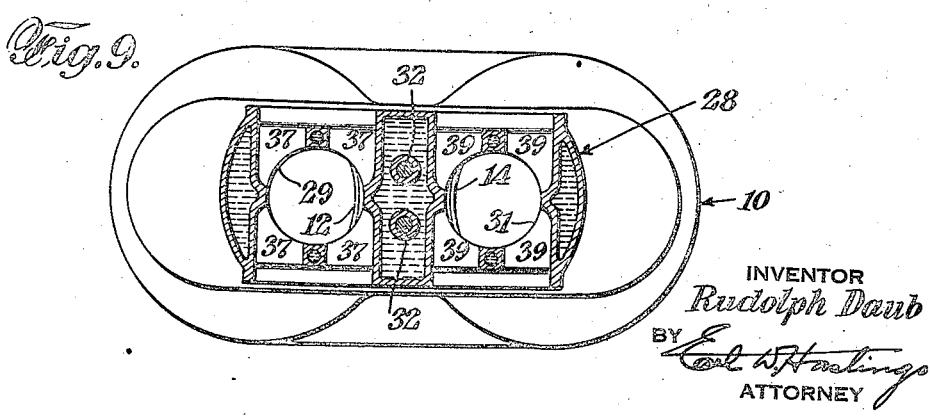

Patented Aug. 11, 1936

2,050,748

UNITED STATES PATENT OFFICE 2,050,748

TWO-CYCLE ENGINE

Rudolph Daub, Nutley, N. J., assignor to Wright Aeronautical Corporation, a corporation of New York Application April 19, 1933, Serial No. 666,879

25 Claims. (Cl. 123—53)

This invention relates to two-cycle internal combustion engines of the "uniflow" type and more particularly to engines in which pistons control both the intake and exhaust ports.

Considerable development has been made in two-cycle radial engines employing U-type cylinders parallely arranged in line with the crankshaft, wherein one leg of the "U" contains the intake and the other the exhaust ports. While the U-cylinders so arranged result in compactness and low frontal area, the scavenging system is very inefficient for high output requirements. It is well known that U-type cylinders cannot be used efficiently in high compression engines as for example those operating on the Diesel cycle due to the necessarily small combustion chamber which restricts and chokes the flow between cylinders.

It is further well known that for high output per cubic inch displacement, the two-stroke cycle engine of the "opposed" cylinder type and of "straight-thru" scavenging is far superior to all other types of two or four cycle engines. For inherent lightness, compactness, low manufacturing cost and good accessibility, especially as used in aviation, the radial engine is superior.

Another disadvantage of the U-type cylinder using one leg for intake and the other for exhaust is that the diameter of the piston operating in the exhaust leg is limited due to heat dissipation requirements, which results in a relatively high frontal area to cylinder displacement ratio.

One of the main objects of the invention is to provide a simple and efficient multicylinder power unit of the piston controlled "straight-thru" scavenging type, wherein all of the pistons may operate from a single crankshaft.

Another object of the invention is to provide a radial engine comprising power units of the piston controlled and "straight-thru" scavenging type.

A further object is to provide a radial engine of high output comprising power units of the type described, said engine having a small outside diameter and low frontal area.

Another object of the invention is to provide a radial engine of great structural soundness and simplicity and being substantially void of protuberances.

A still further object of the invention is to provide a compact power unit having a combustion chamber common to two U-shape cylinders wherein all the pistons are operable from a single crankshaft.

A further object is to provide a radial engine composed of power units comprising a plurality of U-shaped cylinders coacting in a combustion chamber wherein three separate banks of radial crank trains operate a single bank radial engine.

Another object of the invention is to provide a power unit of the character described wherein the combustion chamber lends itself to various fuel injections and combustion systems most effectively.

Another object is to provide a power unit of this character wherein pump means may be easily and simply incorporated.

A still another object is to provide an engine of this character wherein the exhaust controlling pistons are relieved of side thrust.

In the drawings, there is illustrated two forms of my invention by way of example and it is to be understood that various changes and additions may be made without departing from the spirit of the invention which is defined in the appended claims.

Figure 1 is a longitudinal section of a power unit constructed in accordance with the invention.

Figure 2 is a transverse section on the line 2—2 of Fig. 1.

Figure 3 is a transverse section on the line 3—3 of Fig. 1.

Figure 4 is a transverse sectional view of a radial engine constructed with the power units of Fig. 1.

Figure 5 is a front view of the engine shown in Fig. 4 with the front crankcase removed and some of the parts shown in section.

Figure 6 is a transverse section taken on line 6—6 of Fig. 4, with the pistons removed.

Figure 7 is a transverse section taken on the line 7—7 of Fig. 4.

Figure 8 is a section taken on the line 8—8 of Fig. 4.

Figure 9 is a section taken on the line 9—9 of Fig. 4.

Referring to Figs. 1, 2 and 3, a cylinder block 10 is provided with a pair of cylinder bores 12 and 14 which are spaced apart to provide a crosshead bore 11 therebetween. A cross head 13 is adapted to reciprocate in the cross head bore and intake pistons 16 and 18 are adapted to reciprocate in bores 12 and 14 respectively.

A crankshaft 19 is provided with three throws 20, 21 and 22. The throws 20 and 22 are adapted to operate the intake pistons 16 and 18 respectively by means of connecting rods 24 and 26. The crosshead 13 is adapted to be operated by the crank throw 21 as by means of a connecting rod 23. A combustion chamber c is arranged to communicate with the upper end of the intake bores 12 and 14 and it will be noted that the intake cylinder bores and the combustion chamber constitute an inverted U-cylinder arrangement.

Secured to the open end of the cylinder block 10 at the top thereof is a cylinder head 28 having a pair of cylinder bores 29 and 31. Adapted to reciprocate in said head are a pair of exhaust pistons 33 and 35, which are connected together by a beam 30. It will be noted that the exhaust bores and the combustion chamber also form a U-cylinder arrangement. The bridges of both the intake and exhaust U-type cylinders are commonly provided by the combustion chamber. A pair of tie rods 32 are adapted to connect the exhaust pistons to the crosshead, which construction results in relieving the exhaust pistons of all side thrust which materially reduces the lubricating problems. All cylinder bores are preferably parallel and coplanal. The motion of the exhaust and intake pistons relative to each other are substantially opposed.

Intake ports 36 and 38 substantially surround the intake cylinders and exhaust ports 37 and 39 substantially surround the exhaust cylinders. The movement of the pistons in their respective bores are adapted to control the ports in the respective cylinders. Both the intake and exhaust ports are arranged to open substantially at the same time but it is preferred to open and close the exhaust ports slightly earlier. This is effected by phasing the crank throw 21 with respect to the throws 20 and 22 correspondingly.

It is to be understood that more than one piston may be substituted for any one of the exhaust pistons 33 and 35 in order to reduce the piston head area without sacrificing piston circumference and thereby maintain a relative large port capacity.

A simple and efficient pump may be provided as seen in Figures 1, 2 and 3 by securing a disc piston 40 to the beam 30. A pump casing may be integrally formed with the cylinder head as at 41. Automatic flap valves 42 and 42a may be suitably arranged, to respectively control the intake and exhaust of air. Conduits 43b and 43 cooperating respectively with the valves 42 and 42a are arranged to direct the charge and discharge of the pump. The air pumped on both strokes of the piston 40 is discharged into the conduits 43 which communicate with the inlet ports 36 and 38 of the cylinders 12 and 14.

Referring to Figs. 4 and 5, which illustrate the adaption of the invention in a radial form, using master and articulated connecting rods. A crankcase 50 is provided, to which is suitably secured a plurality of power units 51 which are similar to that previously described in connection with Fig. 1, with the exception of the omission of the pump arrangement. The axis of the crankshaft is indicated as at a and the exhaust crank throw 21 is shown phased with the crank throws 20 and 22 as indicated by the angle X. Master rods 52 and 53 of the intake pistons are arranged oppositely to comprise unequal intake port timing due to articulated rod motion as well as to assist in balancing.

As seen in Fig. 4, intake openings 54 are provided in the cylinder casings which may be connected to blower 55 by any suitable means (not shown).

Referring to the combustion chamber C the preferred shape thereof is illustrated in Fig. 8, which substantially comprises two cups 60 and 61 joined by a throat 63. The cup 60 overlies the intake cylinder 12 and the cup 61 overlies the intake cylinder 14. As seen in plan (Figure 8) the cups are offset with respect to their cylinders, i. e., the center distance between the cups is materially less than the center distance between cylinders. Each cup and its respective underlying cylinder are so related that they are substantially tangent at one point or in other words the cylinder and its respective overlying cup are substantially tangent as seen in Figure 8. The cups are preferably smaller in diameter than the intake cylinder. This arrangement of offsetting a cup of the combustion chamber with respect to its underlying cylinder assists the charge in maintaining orderly rotational turbulence in passing from the larger intake cylinder into the smaller cup of the combustion chamber, as distinguished from a centrally located combustion chamber.

This tangential offsetting plus the relative difference in diameters results not only in orderly turbulence but also effects an increase in the rotational speed of the charge in the combustion chamber as compared to the rotational speed of the charge in the intake cylinder.

The power unit may be operated on the Diesel cycle with the combustion chamber used as a direct injection chamber by injecting oil into both cups simultaneously or as a precombustion chamber by injecting the entire oil charge into one cup.

Under all load conditions the orderly turbulence is maintained in the cups which improves the combustion in both oil and gasoline engines. In the oil engine the highly heated air in the combustion chamber is forced orderly and swiftly past the fuel spray, which accomplishes complete intermixture in a very short period. In the gasoline engine the orderly rotation of the mixture forces the cooler and richer part thereof to the periphery of the combustion chamber past the spark plug, while the hotter and poorer portion of the mixture is held in the center.

The engine can also be operated with both cups forming combustion chambers independent of each other, if such an arrangement is desired, with equal efficiency in regard to turbulence and stratification.

Having thus described the invention, what I claim as new and desire to secure by Letters Patent, is:—

1. An internal combustion engine having a power unit comprising two U-type cylinders communicating in a common combustion chamber, said U-type cylinders being opposed to each other, on opposite sides of the combustion chamber, one of said U-type cylinders comprising a pair of exhaust cylinders and the other of said U-type cylinders comprising a pair of intake cylinders.

2. An internal combustion engine having a power unit comprising two U-type cylinders having a common combustion chamber, exhaust ports in the legs of one of the U-type cylinders and intake ports in the legs of the other U-type cylinder, said exhaust ports being located outward of the intake ports and the legs of the U-type cylinders having the exhaust ports, being substantially within the projected confines of the legs of the other U-type cylinder.

3. An internal combustion engine having a power unit comprising a U-type cylinder having a combination chamber, and a plurality of cylinders communicating with said combustion chamber, each of said cylinders adapted to be substantially within the projected confines of one of the U-type cylinders.

4. An internal combustion engine having a power unit comprising a pair of opposed cylinders, pistons in the cylinders, a combustion chamber commonly communicative with each of the opposed cylinders, said opposed cylinders being arranged in parallel, and means rigidly joining two of the pistons whereby they move together.

5. An internal combustion engine having a power unit comprising an H-type cylinder arrangement, the combustion chamber forming the horizontal portion and the cylinders the vertical portions of the H, each of the vertical portions of the H on one side of the combustion chamber being substantially within the projected confines of the respective legs of the other vertical portions.

6. An internal combustion engine having a power unit comprising a plurality of communicating opposed cylinders, pistons in said cylinders, separate operating means for each of a plurality of corresponding pistons in corresponding cylinders and a single operating means for the remaining pistons.

7. An internal combustion engine having a power unit comprising a single combustion chamber, a crankshaft and a plurality of corresponding pistons adapted to move toward, and a plurality of corresponding pistons adapted to move in unison, away from the crankshaft during the expansion stroke, separate operating means for each of the pistons, means adapted to work in unison and adapted to move toward the crankshaft, and a single operating means working in phased relation with the other operating means for the pistons adapted to move away from the crankshaft during the expansion stroke.

8. An internal combustion engine comprising a power unit having a cylinder block, a cylinder head, a combustion chamber between said block and head, a plurality of corresponding valve controlling pistons in the head adapted to move in unison and a plurality of valve controlling pistons in the block, all of said pistons commonly communicative in the combustion chamber, a single operating means for the pistons in the head, disposed between said pistons in the block.

9. An internal combustion engine comprising a power unit having a cylinder block, a cylinder head, a plurality of corresponding valve controlling pistons adapted to move in unison in the head, a plurality of valve controlling pistons in the block, a single operating means for the pistons in the head, disposed between said pistons in the block.

10. In an internal combustion engine, a power unit comprising a plurality of corresponding intake controlling pistons and a plurality of corresponding exhaust controlling pistons adapted to move in unison, and a single operating means for said last mentioned piston means.

11. In an internal combustion engine, a power unit having a combustion chamber, a block, a head, a plurality of pistons in the block, a plurality of corresponding pistons adapted to move in unison in the head, separate operating means for the pistons in the block, and a single operating means for the pistons in the head, all of said pistons commonly communicative with the combustion chamber.

12. A casing for an internal combustion engine comprising a combustion chamber having a plurality of cylinders communicating with said combustion chamber, a plurality of intake cylinders on one side of the combustion chamber and a plurality of exhaust cylinders on the other side of said combustion chamber, both sets of cylinders arranged in substantially parallel alignment.

13. An internal combustion engine having a single crankshaft, a plurality of power units each comprising a pair of U-type cylinders arranged radially around said crankshaft, the legs of one of said U-type cylinders being arranged in opposed relationship to the legs of the U-type cylinders.

14. A radial engine comprising a plurality of power units, each unit having a plurality of intake and exhaust cylinders, all of said exhaust cylinders being arranged radially remote of said intake cylinders, and in opposed relationship to the intake cylinders.

15. A radial engine having a single crankshaft, a plurality of opposed cylinder type power units arranged around the crankshaft, each of said power units comprising a plurality of opposed cylinders.

16. A radial engine having a single bank of power units, each power unit comprising a plurality of U-type cylinders having a common combustion chamber, the legs of said cylinders being arranged in opposed relationship.

17. A radial engine having a single bank of power units comprising two banks of opposed cylinders, pistons in said cylinders, a single bank of operating means for pistons in one group of corresponding cylinders, and separate operating means for the pistons in the other group of corresponding cylinders in separate banks, the opposed cylinders in each power unit being commonly communicative with a single combustion chamber.

18. A radial engine having a single bank of power units, two banks of opposed cylinders, pistons in said cylinders comprising groups of corresponding moving pistons, a single bank of operating means for one group of correspondingly moving pistons, and a separate bank of operating means for each bank of the other group of the correspondingly moving pistons.

19. An internal combustion engine having a power unit comprising a crankshaft, a plurality of corresponding pistons adapted to move in unison, toward, and a plurality of corresponding pistons adapted to move in unison, away from the crankshaft during the expansion stroke, the pistons adapted to move away, substantially overlying the other pistons.

20. A radial engine having a crankshaft, a plurality of power units arranged radially around the crankshaft, each of said power units including a plurality of opposed cylinders communicating with a single combustion chamber.

21. A radial engine having a single crankshaft, and a plurality of opposed cylinder type power units, each power unit comprising a plurality of opposed cylinders, said opposed cylinders having intake and exhaust ports, said exhaust ports being arranged radially remote of the intake ports.

22. A radial engine having a single bank of power units, said power units comprising two banks of opposed cylinders.

23. An internal combustion engine having in combination, a crankshaft having three throws, two intake cylinders, a plurality of exhaust cylinders, a common combustion chamber for all of the cylinders, pistons in the cylinders, means cooperative with the pistons in the intake cylinders connected to the outer throws of the crankshaft, and means cooperative with the pistons in the exhaust cylinders connected to the middle throw of the crankshaft, said exhaust cylinders being disposed on the side of the combustion chamber remote of the crankshaft.

24. A radial internal combustion engine having in combination, a single three throw crankshaft, a crankcase, a plurality of power units on the crankcase arranged radially around the crankshaft, each unit comprising two intake cylinders, a plurality of exhaust cylinders, a combustion chamber for all of the cylinders, pistons in the cylinders, means cooperative with the pistons in the intake cylinders connected to the outer throws of the crankshaft, and means cooperative with the pistons in the exhaust cylinders connected to the middle throw of the crankshaft, said exhaust cylinders being disposed radially remote of the intake cylinders.

25. An internal combustion engine having a power unit comprising a plurality of communicating opposed cylinders, a single operating means for a plurality of corresponding pistons adapted to move together at all times in corresponding cylinders, and separate operating means for corresponding pistons moving substantially together in the remaining and corresponding cylinders.

RUDOLPH DAUB.